United States Patent
Schneider et al.

(10) Patent No.: US 10,164,888 B2
(45) Date of Patent: Dec. 25, 2018

(54) QUALITY OF SERVICE FOR A UNIVERSAL SERIAL BUS

(71) Applicant: Intel IP Corporation, Santa Clara, CA (US)

(72) Inventors: Reinhold Schneider, Veitsbronn (DE); Ulrich Leucht-Roth, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 210 days.

(21) Appl. No.: 14/866,537

(22) Filed: Sep. 25, 2015

(65) Prior Publication Data

US 2016/0344638 A1 Nov. 24, 2016

Related U.S. Application Data

(60) Provisional application No. 62/164,489, filed on May 20, 2015.

(51) Int. Cl.
*H04L 12/859* (2013.01)
*H04L 25/14* (2006.01)
(Continued)

(52) U.S. Cl.
CPC .... *H04L 47/2475* (2013.01); *H04L 12/40065* (2013.01); *H04L 25/14* (2013.01);
(Continued)

(58) Field of Classification Search
CPC ............... H04L 47/10; H04L 29/06523; H04L 29/08954; H04L 29/08945; H04L 41/5003;
(Continued)

(56) References Cited

U.S. PATENT DOCUMENTS 8,200,858 B1   6/2012  Shor
2005/0249117 A1*  11/2005  Gerkins ............. H04L 47/6215
                                                            370/230
(Continued)

FOREIGN PATENT DOCUMENTS

JP        2006333242 A    12/2006
KR     1020110013994       2/2011
(Continued)

OTHER PUBLICATIONS

PCT International Search Report, PCT App. No. PCT/US2016/027571, dated Jul. 8, 2016, 3 pages.

*Primary Examiner* — Ashley Shivers
(74) *Attorney, Agent, or Firm* — Alliance IP, LLC

(57) ABSTRACT

Disclosed herein is a computing device with a USB port configured to implement Quality of Service (QoS) associated with a network. The computing device includes a modem to enable each of the IP applications to communicate with a network via one or more bearer channels. At least one of the bearer channels is managed by a set of packet filter rules corresponding to a Quality of Service (QoS) description. The computing device also includes a Universal Serial Bus (USB) interface to couple a host and the modem, the USB interface comprising a plurality of logical channels each comprising logical channel endpoints. Each logical channel endpoint is dedicated to a particular bearer channel.

20 Claims, 7 Drawing Sheets

(51) Int. Cl.
*H04L 12/40* (2006.01)
*H04L 12/813* (2013.01)
*H04L 12/927* (2013.01)
*H04W 28/02* (2009.01)

(52) U.S. Cl.
CPC ............ *H04L 47/20* (2013.01); *H04L 47/803* (2013.01); *H04W 28/0263* (2013.01)

(58) Field of Classification Search
CPC ..... H04L 45/30; H04L 45/302; H04L 45/304; H04L 47/11; H04L 47/12; H04L 47/14; H04L 47/2416; H04L 47/2408; H04L 47/80; H04L 47/2475; H04L 47/2491; H04L 47/24; H04L 47/805; H04L 65/80; H04L 67/322; H04L 12/2863; H04L 25/14; H04L 12/40; H04L 12/40065; H04L 47/803; H04W 28/02; H04W 28/0268; H04W 28/16; H04W 28/24; H04W 28/0252; H04W 28/0263; H04W 28/0257; H04W 28/085; H04W 28/18; H04W 28/0231; H04W 28/0284; H04W 28/0289; H04W 28/10; H04W 40/12; H04W 72/04; H04W 72/06; H04W 72/087; H04W 72/10; H04W 72/1226; H04W 72/1236
See application file for complete search history.

(56) References Cited

U.S. PATENT DOCUMENTS

| | | | |
|---|---|---|---|
| 2007/0189235 A1* | 8/2007 | Chandra | H04B 7/2612 370/335 |
| 2009/0006703 A1* | 1/2009 | Fa | G06F 13/385 710/305 |
| 2010/0074182 A1* | 3/2010 | Shao | H04L 1/00 370/328 |
| 2014/0233616 A1* | 8/2014 | Belghoul | H04M 11/06 375/222 |

FOREIGN PATENT DOCUMENTS

| | | |
|---|---|---|
| KR | 1020110083184 | 7/2011 |
| KR | 1020140119565 | 10/2014 |
| WO | WO 2016/186764 | 11/2016 |

\* cited by examiner

QUALITY OF SERVICE FOR A UNIVERSAL SERIAL BUS

CROSS-REFERENCED TO RELATED APPLICATION

The present application claims the benefit of U.S. Provisional Patent Application Ser. No. 62/164,489 by Reinhold Schneider et al., which is entitled 'Quality of Service for a Universal Bus' and was filed May 20, 2015, the contents of which is incorporated herein by reference as though fully set forth herein.

TECHNICAL FIELD

The present disclosure relates to techniques for controlling Quality of Service (QoS) in a Universal Serial Bus (USB). More specifically, the present techniques relate to systems and methods for preventing packet congestion.

BACKGROUND ART

With the growing deployment of the high-speed wireless communication standards, such as LTE (Long-Term Evolution), LTE advanced, and others, the bandwidth available for a single user equipment (UE) increases substantially compared to previous radio technologies like Global System for Mobile Communications (GSM) and Universal Mobile Telecommunications System (UMTS). With the growing LTE coverage and their higher data rates, more and more users are using their mobile devices for their day to day businesses. Therefore, more services will be deployed using Internet Protocol technology, such as chat and other more time critical services like Voice over LTE (VoLTE), online gaming, and others. In products such as notebooks, an LTE modem will most likely be included in the future, which also leads to an increase of services running over LTE. It is possible that almost all currently known IP services will eventually be provided via LTE.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
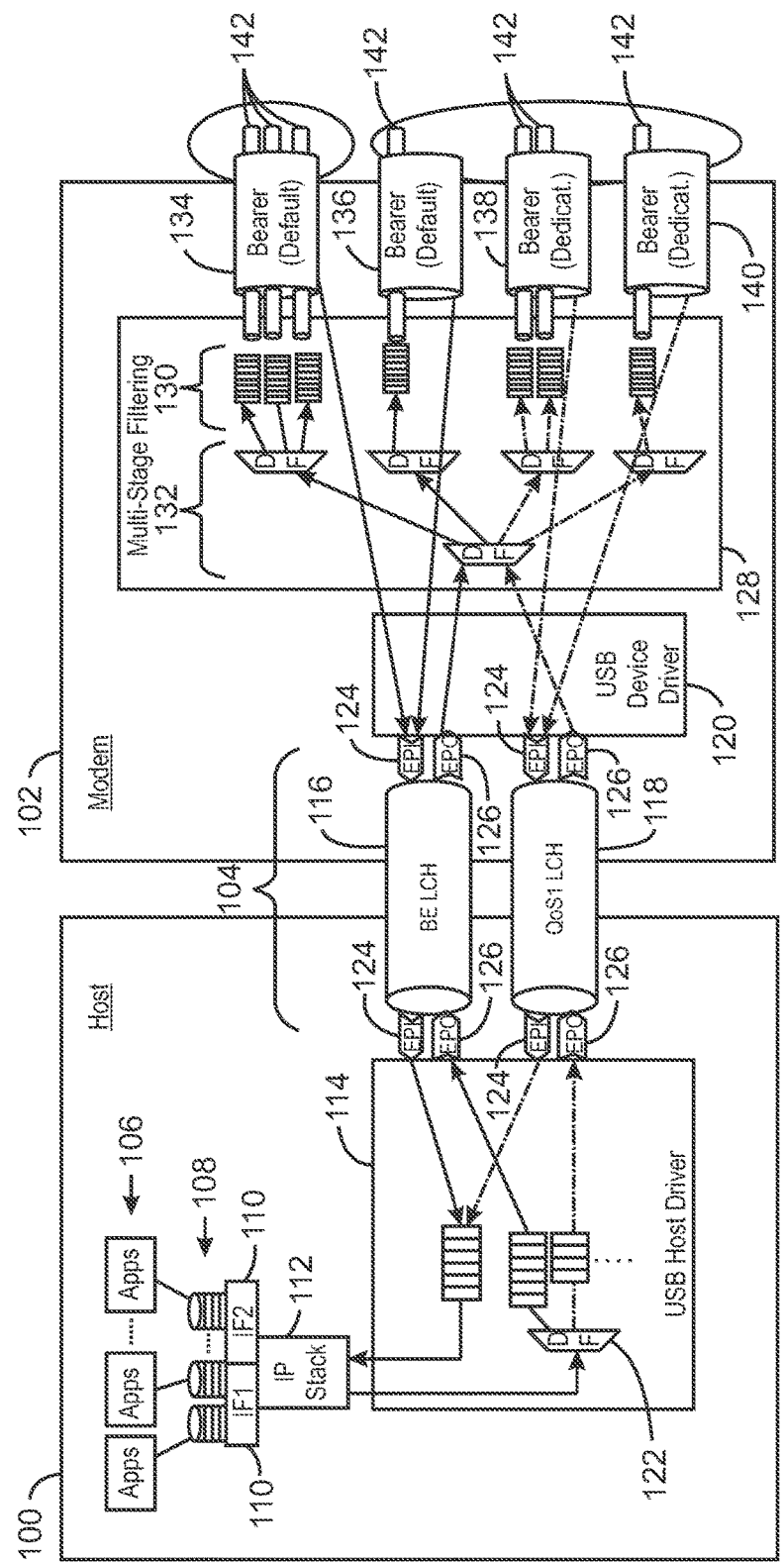
FIG. 1 is a block diagram of an example system for implementing QoS over a USB interface.

The present disclosure provides techniques for improved Quality of Service (QoS) procedures for USB. Increased usage of high-speed wireless communication standards such as LTE may lead to the issue that the available bandwidth at the Inter-Processor Communication (IPC) interface and modem resources like buffer capacity become critical. Accordingly, buffer capacity may no longer be available in surplus to their needs and will be allocated amongst the different IP flows in accordance to their priority, service class, or similar characteristics.

As an example, a 3GPP (3rd Generation Partnership Project) modem is connected as a USB device to an application processor providing the USB host functionality. Internet Protocol (IP) traffic is mainly exchanged in the Communication Device Class family via USB bulk endpoints. In accordance with the 3GPP specification, the 3GPP modem implementing the 3GPP defined QoS model provides storage capacity for IP packets to overcome short term air bandwidth variations, to allow for fast reaction times for UL (Upload) packet transmission permissions, and re-transmission policies. Storage on the modem is used for these processes. Otherwise, communication flow between the modem and the host would be too slow because the host could be busy with other processing tasks.

Due to the storage capacity it might happen that certain IP services queue up at the modem consuming most if not all of the capacity, leaving little or no space for other IP services. The modem can no longer accept new data and real-time critical services might suffer or might miss their deadlines. For instance, voice related Voice over Internet Protocol (VoIP) audio packets or even more critical VoIP control packets may get lost or arrive too late, leading to dropped calls and generally to a bad user experience.

The present disclosure provides new QoS enabling techniques to link the network defined QoS at the USB device with the IP based application layer at the USB host. Embodiments of the present techniques enable a host to adapt itself to defined quality of service (QoS) architecture by distributing the IP flows on different USB bulk endpoints, each of which can be managed independently. A USB bulk endpoint or endpoint pair shall be dedicated to some QoS grouping. The QoS grouping can be used by the sender (host or device) to transport those IP flows targeted for the QoS bearers, as defined by the applicable specification such as 3GPP.

Modern operating systems typically implement an active queue management (AQM) that attempts to share the available bandwidth and prioritize IP packets in accordance to their importance. Such an active queue management or similar algorithm on the host works better if the host knows about the available bandwidth or congestion situation of the different services.

The bandwidth over the USB bus is usually not the limiting factor. Rather the device on the receiving side of the USB bus, e.g. the modem, is usually the limiting factor due to the limited buffering capacity and their distribution to the QoS bearers on the device side. Since the USB host has no knowledge of the importance of IP packets and the device does not know about them before receiving them, IP packets can easily overrun the buffering capacity of the device, possibly starving out more important IP packets.

To avoid overrunning the buffering capacity of the receiving device, e.g., the modem, the present disclosure provides a technique wherein the USB Mobile Broadband Interface Model (MBIM) protocol is enhanced to include multiple USB bulk endpoints and distribute the IP packets to the endpoints by their priority or service class categorization, for example. The distribution function, i.e. filtering rules, will be given to the host by the device deriving it from the 3GPP defined traffic flow template (TFT) information that the modem is given by the network at QoS bearer activation and modification time.

The device, when recognizing an upcoming congestion situation, can control the IP packet inflow by using the USB based flow control on that USB endpoint connected to the specific QoS group causing this emerging congestion. The other services can then still run through the other USB bulk endpoints. After the congestion situation is resolved, the specific USB endpoint may accept new USB transfers.

In some examples, the 3GPP defined QoS architecture implemented on the modem is extended to the USB connected host. For example, the USB bus between the host and the modem can include multiple pairs of USB bulk IN and bulk OUT endpoint pairs. Optionally, the USB bus between the host and the modem can include a single USB bulk IN and multiple USB bulk OUT endpoints. In either case, multiple USB bulk endpoints may be set up dynamically when needed or statically through some host and device agreement, either via a data sheet specification or during USB enumeration.

Embodiments of the present techniques are describe further below. The present disclosure is described in relation to the LTE wireless communication protocol developed by the 3rd Generation Partnership Project (3GPP) organization and the Universal Serial Bus (USB) protocol. However, it will be appreciated that the techniques described herein may be applied in relation to other communication protocols.

FIG. 1 is a block diagram of an example system for implementing QoS over a USB interface. The system includes a host 100 and a modem 102. The host 100 and the modem 102 may be included in a computing device such as a mobile phone, a smart phone, a laptop computer, or a tablet computer, for example. The modem 102 may be any type of modem, including an LTE modem.

As shown in FIG. 1, one or more applications 106 can be running on the host 100. The host 100 may include various hardware to support the execution of the applications, including one or more processors, memory devices, data storage devices, and others. The modem 102 enables the applications to communicate wirelessly with remote computing systems, for example, through the Internet. The host 100 and the modem 102 communicate through an Inter Processor Communication (IPC) interface, referred to herein as USB interface 104. In some examples, the USB interface 104 is a USB MBIM interface. With regard to the flow of data, UpLoad (UL) direction is in the direction from the host 100 to the modem 102, while the DownLoad (DL) direction is in the direction from the modem 102 to the host 100.

The host 100 includes a TCP/UDP socket 108, and one or more interfaces 110, an IP stack 112, and a USB host driver 114. The USB interface 104 includes a plurality of logical channels (LCH) 116 and 118, also referred to as bulk endpoints. Each logical channel can be associated with a different QoS. The communications between the host 100 and modem 102 occur between a USB host driver 114 on the host 100 and a USB device driver 120 on the modem 102. The USB host driver 114 includes buffers and implements one or more Distribution Functions (DFs) 122 to control the flow of packets to and from the logical channels 116 and 118. The distribution function 122 may be implemented in any suitable type of hardware or combination of hardware and software. For example, the distribution functions 122 may be implemented by software or firmware executing on a processor such as a Digital Signal Processor (DSP), or specific hardware circuitry including one or more multiplexers.

The distribution function 122 implement packet flow control in accordance with the applicable QoS rules received from the modem 102. The QoS rules may be received by the modem from the device (not shown) and can be derived from the IP header parameters, IP addresses, port numbers, protocol type, and other information received from the device. On the host side, each logical channel 116 and 118 is associated with a particular bulk IN endpoint (EPI) 124, at which incoming packets are received, and bulk OUT endpoint (EPO) 126, to which outgoing packets are sent. The USB host driver 114 selects a particular bulk OUT endpoint, based on the QoS rules.

The modem 102 includes a multi-stage filter system 128 that includes buffers 130 and distribution functions 132 that control the flow of packets in the modem 102. The distribution functions 132 in the modem 102 couple each bearer 134-140 with the appropriate logical channel 116 or 118 of the USB interface 104 in accordance with the applicable QoS rules. On the modem side, each logical channel 116 and 118 is associated with a particular bulk IN endpoint (EPI) 124, at which outgoing packets are sent to the host 100, and bulk OUT endpoint (EPO) 126, at which incoming packets from the host are received.

The applications 106 shown in FIG. 1 are IP based applications for which the 3GPP core network has established a number of bearers 134 to 140 for the different QoS needs of the applications 106. Each bearer 134 to 140 may support a number of IP flows 142, each of which may be associated with a specific application 106. Each bearer may also be associated with a different type of data network. For example, bearer 134 may be associated with the Internet, while bearers 136 to 140 may be associated with an IP multimedia system.

At bearer establishment and later at a possible bearer modification time, the network, e.g. in LTE from the Policy and Charging Rules Function (PCRF) in the Evolved Packet Core (EPC), provides the modem 102 a Traffic Flow Template (TFT) containing a number of packet filters. These packet filters contain filter criteria to be used to determine the IP packets to be sent over each bearer 136 to 140. In some cases, the filter rule list derived from this TFT is further given to the host 100. The filter rule list may be provided to host 100 if the modem 102 wants the host 100 to use a specific bulk OUT endpoint for that service category instead of the default OUT endpoint. In FIG. 1, the default OUT endpoint is the Best Effort (BE) Logical Channel (LCH) 116. The logical channel QoS1 118 is associated with a first set of filter rules for a first QoS. The USB interface 104 can also include additional logical channels associated with different filter rules, i.e., QoS2, QoS3, and so on.

Once set up, the host 100 has a number of filter rules to distribute the upload IP packets to the different logical channels, i.e. the bulk OUT endpoints 126. The default best effort bulk OUT endpoints associated with the Best Effort logical channel 116 transmits all IP packets that do not match any of the filter rules. The same behavior is also applied on the modem 102 again to fill the bearers accordingly. In some examples, the usage of the bulk endpoints 124 and 126 have been agreed upon during enumeration or in accordance with a data sheet specification, and no filter rules list is exchanged, because the filtering rules are known in advance without any further negotiations.

In the example shown in FIG. 1, the modem 102 has the same possibility to choose the appropriate bulk IN endpoint by using the information regarding which bearer the download IP packet arrived on. The difference between upload and download is that the host 100 can do back pressure towards the application layer, whereas the modem 102 can only decide which IP packets to discard in case of congestion towards the host 100.

In the event that the modem 102 detects an upcoming congestion situation, the modem 102 can control the IP packet inflow by using the USB based flow control on that USB endpoint connected to the specific QoS group causing this emerging congestion. The other services can then still run through the other bulk endpoints. After the congestion situation is alleviated, the specific bulk endpoint that had been causing the congestion may begin to accept new packet transfers.

Figure 2:
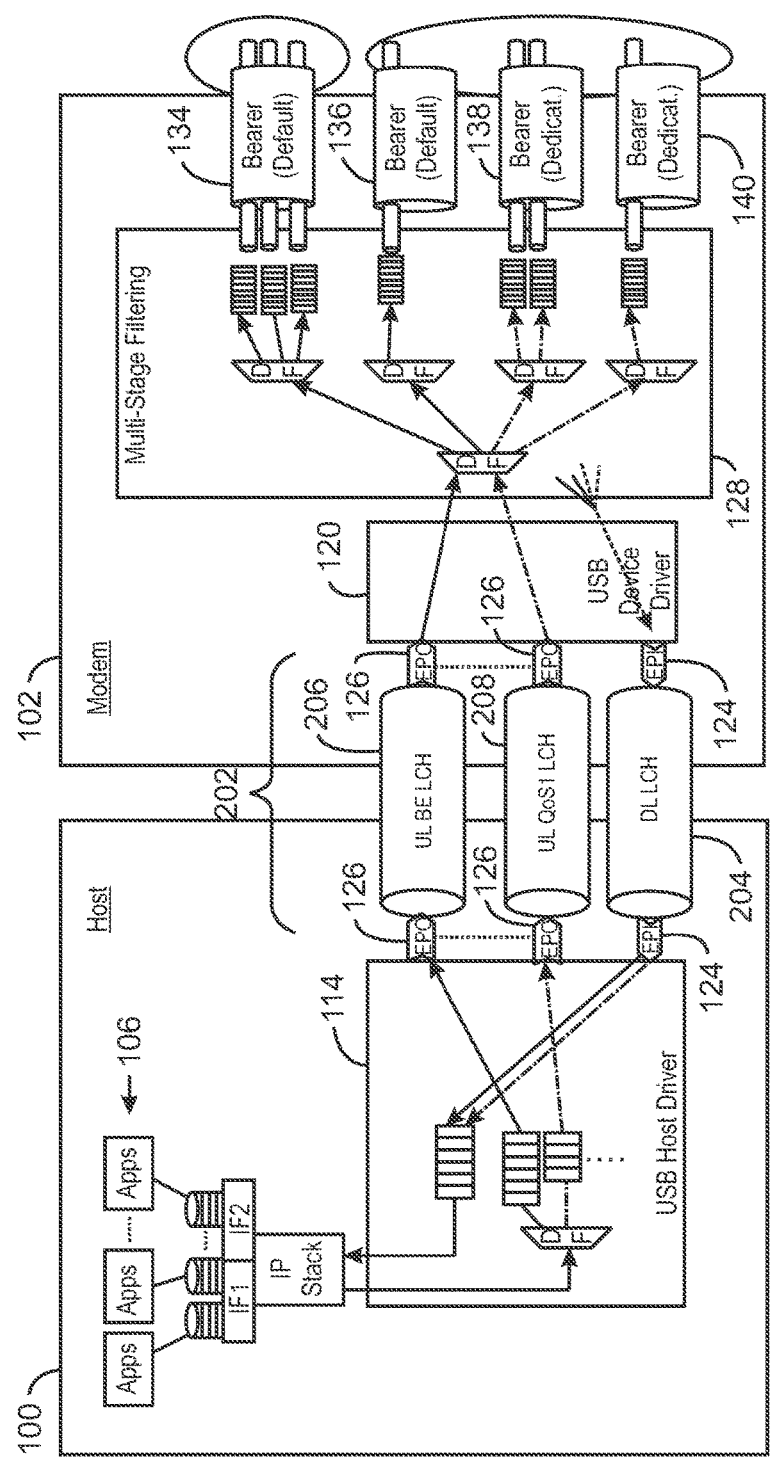
FIG. 2 is a block diagram of another example system for implementing QoS over a USB interface.

FIG. 2 is a block diagram of another example system for implementing QoS over a USB interface. As in FIG. 1, the system includes a host 100, a modem 102, and a USB interface 202 with multiple logical channels 204, 206, and 208, also referred to as bulk endpoints. Unlike the system of FIG. 1, the download and upload channels of the USB interface are not symmetrical. In other words, the USB interface 202 includes one Download Logical Channel (DL LCH) 204, and a plurality of upload logical channels, including an UpLoad Best Effort Logical Channel (UL BE LCH) 206 and UL QoS1 LCH 208. The USB interface 202 can include any number of additional QoS logical channels, each associated with filter rules, e.g., QoS2 LCH, QoS3 LCH, etc. The Download Logical Channel (DL LCH) 204 includes the bulk IN endpoints 124, while the UL BE LCH 206 and UL QoS1 LCH 208 each have separate bulk OUT endpoints 126.

As explained in relation to FIG. 1, the modem 102 cannot do much about a congestion situation in the direction towards the host 100 and so the device (not shown) and host 100 may be configured to just use the one bulk IN endpoint 124 for all download traffic. In the direction towards the modem, the system of FIG. 2 operates the same as the system shown in FIG. 1.

As seen in FIG. 2, all upload IP packets are distributed to the different logical channels, namely the bulk OUT endpoints 126 in accordance to some filter rules. However, all download IP packets are sent over the single bulk IN endpoint 124. In some instances, such as when the USB 2.0 protocol is used, the use of one bulk IN endpoint 124 is beneficial because the host 100 does not need to poll more than just this one IN endpoint for the given MBIM function at given intervals, which lowers the performance impact on the USB interface 202.

Informing the Host about Packet Filters

The present disclosure discloses two possible technique for enabling the modem 102 to inform the host 100 about filter rules, referred to herein as the in-band and out-of-band filtering rules information elements. The particular technique to be used may be derived from the expected frequency of filter rules change notifications. If filter rules change notifications do not occur too frequently, the Encapsulated Command method may also be used.

At USB enumeration time the host 100 and modem 102 will negotiate the selected filter rule option. For both methods, the Function Descriptor would be enhanced by new bit values for the bmNetworkCapabilities. The new value is referred to as D5, and is a function that supports Information Notifications for filtering rules.

In the in-band technique, a new information element is added to the existing NCM/MBIM Network Control Module (NCM) Transfer Block (NTB) structure. In some examples, the function descriptor can be enhanced to provide the optional information update for filtering rules, which the host 100 may or may not use. The host 100 and modem 102 will negotiate with the available GetNtbParameters/SetNtbParameters.

An extended bmNtbFormatsSupported range in the NTB Parameter Structure can contains two new format values. During enumeration, the host 100 sends the GetNtbParameters and, if it is supported by the modem 102, the GetNtbFormat. In response, the modem 102 sends the supported NTB formats as defined in the SetNtbFormat below. The host 100 accepts or rejects the provided values via the SetNtbFormat command. In some examples, the bmNtbFormatsSupported field may be defined as follows:

Bit 0: 16 bit NTB supported (set to 1)
Bit 1: 32 bit NTB supported
Bit 2: 16 bit Extended NTB supported (new)
Bit 3: 32 bit Extended NTB supported (new)
Bits 4 to 15: reserved (fixed set to 0, must be ignored by the host)

The specified wValue in the SetNtbFormat structure may be as follows:

0000h: NTB16 Format
0001h: NTB32 Format
0010h: NTB16+NTB16 Extended Format
0011h: NTB32+NTB32 Extended Format If the host 100 and modem 102 agree on the Extended Formats, the current Datagram NDPs keep the specified dwSignature values (0x30 . . . and 0x31 . . . ) but the new Information NDPs contain the dwSignature values (0x32 . . . and 0x33 . . . ), respectively. In this way, the Datagram NDPs can be separated from the Information Element NDPs. An example Information Element structure for in-band filter rule notifications is provided in the tables below.

TABLE 1

Information Element NDP16

| Offset | Field | Size | Value | Description |
|---|---|---|---|---|
| 0 | dwSignature | 4 | Number (0x324D434E, 0x334D434E) | See NCM spec [2]. For MBIM it contains IP session ID/DSS Session ID |
| 4 | wLength | 2 | Number | |
| 6 | wNextFpIndex | 2 | Reserved (0) | |
| 8 | wInformationIndex[0] | 2 | Number | Byte index in little endian of the first Information element described by this NDP16. The index is from |

TABLE 1-continued

| | Information Element NDP16 | | | |
|---|---|---|---|---|
| Offset | Field | Size | Value | Description |
| | | | | byte zero of the NTB. This value must be >= the value stored in wHeaderLength of the NTH16 (because it must point past the NTH16) |
| 10 | wInformationLength[0] | 2 | Number | Byte length in little endian of the first Information element described in this NDP16. |
| 12 | wInformationIndex[1] | 2 | Number | |
| 14 | wInformationLength[1] | 2 | Number | |
| | ... | | | |
| wLength − 4 | wInformationIndex[(wLength − 8)/4 1] | 2 | Number(0) | |
| wLenght − 2 | wInformationLength[(wLength − 8)/4 − 1] | 2 | Number(0) | |

TABLE 2

| | Information Element NDP32 | | | |
|---|---|---|---|---|
| Offset | Field | Size | Value | Description |
| 0 | dwSignature | 4 | Number (0x324D434E, 0x334D434E) | See NCM spec. For MBIM it contains IP session ID/DSS Session ID |
| 4 | wLength | 2 | Number | |
| 6 | dwReserved6 | 2 | Reserved(0) | |
| 8 | wNextFpIndex | 4 | Number | |
| 12 | dwReserved12 | 4 | Reserved(0) | |
| 16 | wInformationIndex[0] | 4 | Number | Byte index in little endian of the first Information element described by this NDP32. The index is from byte zero of the NTB. This value must be >= the value stored in wHeaderLength of the NTH32 (because it must point past the NTH32) |
| 20 | wInformationLenght[0] | 4 | Number | Byte length in little endian of the first Information element described in this NDP32. |
| 24 | wInformationIndex[1] | 4 | Number | |
| 28 | wInformationLength[1] | 4 | Number | |
| | ... | | | |
| wLength − 8 | wInformationIndex[(wLength − 8)/8 − 1] | 4 | Number(0) | |
| wLength − 4 | wInformationLength[(wLength − 8)/8 − 1] | 4 | Number(0) | |

TABLE 3

Information Element Structure (derived list from TFT)

| Offset | Field | Size | Value | Description |
|---|---|---|---|---|
| 0 | Operation Code | 1 | Number | See TFT operation code in 3GPP 24.008 10.5.6.12 TFT information element, for more info |
| 1 | Filter Rule Identity | 1 | Number | Filter Rule Identifier, lower nibble contains Filter Rule Identifier, higher nibble contains a bearer identifier |
| 2 | IP Version | 1 | Number | 4 bits are relevant, Bit 4..7 are fix set to (0) |
| 3 | IPProtocol | 1 | Number | E.g.UDP, TCP |
| 4 | Src IP Addr | 4-16 | Number | 4 bytes (IPv4), 16 bytes (IPv6), others may differ in future4 bytes (IPv4), 16 bytes (IPv6), others may differ in future |
| 8..20 | Dest IP Addr | 4-16 | Number | 4 bytes (IPv4), 16 bytes (IPv6), others may differ in future |
| 12 . . . 36 | Src Port Nr | 2 | Number | |
| 14 . . . 38 | Dest Port Nr | 2 | Number | |
| . . . | . . . | | | May contain more elements in future |

Although the structure may be fixed at this stage, the fields may or may not be set. In some examples, the host 100 is informed about packet filters closer to the traffic flow template. In this example, the Information Element structure would contain the packet filter as specified by the packet filter component types in the 3GPP TS 24.008, section 10.5.6.12 Traffic Flow Template. Valid combinations of these packet filter components are specified in 3GPP TS 23.060, section 15.3.2, see [4]. There a traffic flow template can have up to 16 packet filters and so the Information Element Structure would contain a packet filter identifier as well.

In the table below, the Information Element contains some fields as specified in the 3GPP TS 24.008 with an extension to the Packet Filter Identity containing a QoS bearer identity in the higher nibble of the byte. Since up to 16 packet filters may be possible, their identities will run from 0 to 15, fitting in to the lower nibble of the field. The higher nibble may contain a derived QoS bearer identity. For example, the higher nibble may contain a derived QoS bearer identity if the Information Element contains packet filters from different QoS bearers but with the same Packet Filter Identity, in which case an additional QoS bearer identity is used. The host 100 does not need to know the meaning of this identity but only as addressing information for adding or deleting elements.

TABLE 4

Information Element Structure (TFT)

| Offset | Field | Size | Value | Description |
|---|---|---|---|---|
| 0 | ServiceGroupId | 1 | Number | Identity for a list of packet filters, i.e. addresses a group of services |
| 1 | (TFT) Operation Code | 1 | Number | See TFT operation code in 3GPP 24.008 10.5.6.12 TFT information element |
| 2 | Packet Filter Identity | 1 | Number | Packet Filter Identifier, lower nibble contains Packet Filter Identifier, higher nibble contains a bearer identifier |
| 3 | Packet Filter evaluation precedence | 1 | Number | Packet filters are organized in accordance to their precedence. A packet filter with a higher precedence value should be consulted before one with a lower precedence value |
| 4 | Packet Filter Length | 1 | Number | Number in bytes of the packet filter |
| 5 | Reserved | 3 | Number | For future use, set to 0x0 |
| 8 | Packet Filter Component Type Identifier | 1 | Number | Identifier of the packet filter component |
| 9 | Packet Filter Component Length | 1 | Number | Length of the packet filter component in bytes |
| 10 | Packet Filter Component Value | 1 | Number | |
| 11 + X | Packet Filter Component Type Identifier | | | $2^{nd}$ Packet filter component if available |

The out-of-band technique uses Information Notifications via the Encapsulated Commands over the USB control endpoint 0. To use the out-of-band technique, the bmNetworkCapabilities field of the NCM Function Descriptor for the support of Encapsulated Commands, i.e. D2, is set to (1), indicating that the capability is supported. The host 100 may use this field and enable the information notifications via a new command sent via Encapsulated Commands. The host 100 may later disable the notifications when not in use. When the support of Encapsulated Commands is enabled, the modem 102 informs the host 100 at given times, i.e. thresholds, about the congestion situation with unsolicited events over the Encapsulated Commands method. The same Information Element structure described above in relation to the In-band technique can be used in the out-of-band technique, with following new NCM Requests shown in table 5 added.

TABLE 5

NCM Enhanced Requests/Notifications

| Request | Description | Req'd/Opt | |
|---|---|---|---|
| SetInfoElem | Enabling or Disabling Information Element notifications. Contains a Boolean value of True(1) - Enabling or False(0) - Disabling | Optional | If not supported the bmNetworkCapabilities and bmNtbFormatsSupported fields determine whether Information Element notifications are enabled or not. |
| GetInfoElem | Returns the set status as can be set by SetInfoElem. | Optional | |
| InfoElemNotify | Informs about new or changed filtering rules. It contains the Information Element as described in [Table 1 and Table 2] | Optional | If enabled, the device will use this notification to inform the host about a new or changed filtering rules. |
| GetInfoElem | Requests the device to return the Information Element of the addressed filtering rules. The request contains the Information Element structure | Optional | |

The techniques described herein can be implemented in any suitable form of computer logic, including hardware or a combination of hardware and software. Some components may be implemented as instructions stored on the tangible, non-transitory, computer-readable medium, which may be read and executed by a processor to perform the operations described. In addition, a computer-readable medium may include any mechanism for storing or transmitting information in a form readable by a computer. For example, a computer-readable medium may include Read-Only Memory (ROM), Random Access Memory (RAM), magnetic disk storage media, optical storage media, flash memory devices, or electrical, optical, acoustical or other form of propagated signals, e.g., carrier waves, infrared signals, digital signals, or the interfaces that transmit and/or receive signals, among others. Some components, such as the host 100, modem 102 can also be implemented as one or more logic units, such as an Application Specific Integrated Circuit (ASIC), a Field Programmable Gate Array (FPGA), or an arrangement of logic gates implemented in one or more integrated circuits, for example.

Figure 3:
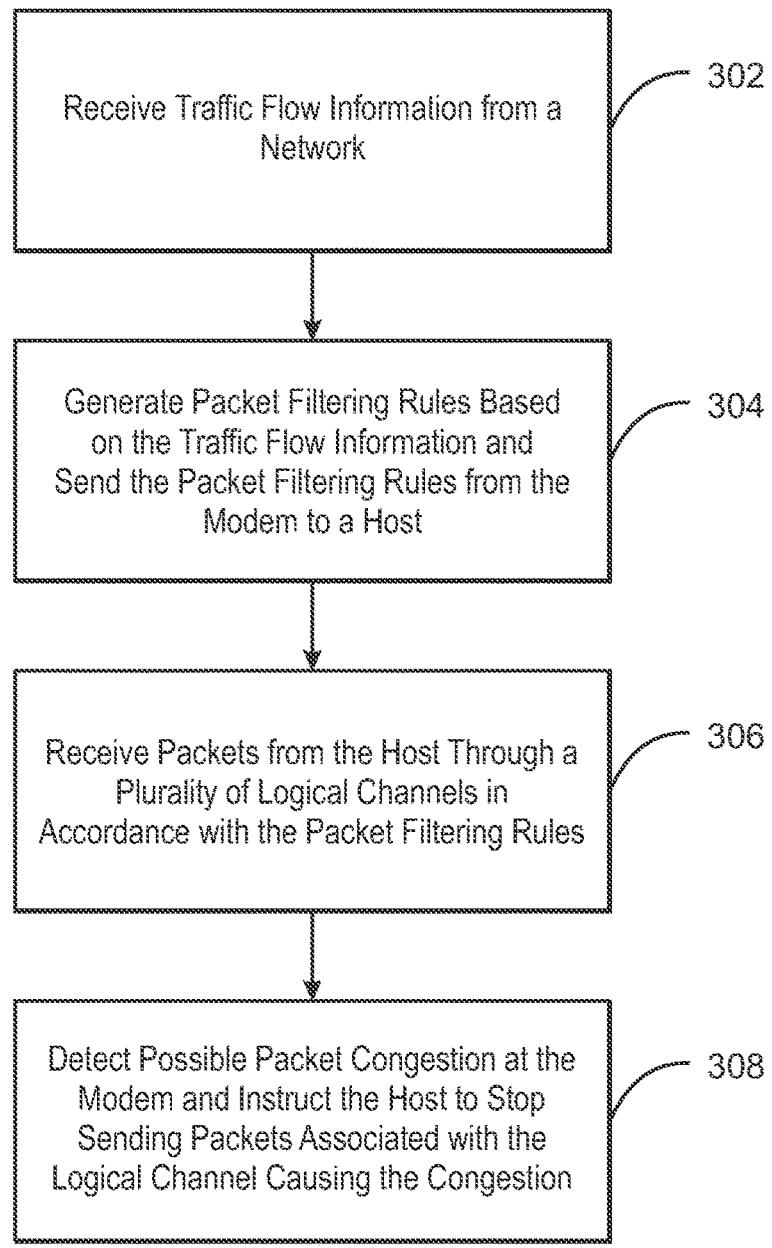
FIG. 3 is a process flow diagram summarizing a technique for implementing a network defined Quality of Service (QoS) in a USB interface.

FIG. 3 is a process flow diagram summarizing a technique for implementing a network defined Quality of Service (QoS) in a USB interface. The method 300 may be performed by the modem 102 shown in FIGS. 1 and 2. It will be understood that the method described herein can include fewer or additional actions. Furthermore, the method 300 should not be interpreted as implying that the actions have to be performed in any specific order.

At block 302, traffic flow information is received from a network. For example, the traffic flow information can be received by the modem and may be associated with a quality of service to be implemented by one or more bearer channels.

At block 304, the modem generates a set of packet filtering rules based on the traffic flow information and sends the packet filtering rules from the modem to a host. The host then implements a distribution function in accordance with the filtering rules.

At block 306, the modem receives packets from the host. The packets are received through a plurality of logical channels in accordance with the packet filtering rules. Each logical channel endpoint is dedicated to a particular bearer channel of the modem and is therefore associated with a particular QoS definition.

At block 308, the modem detects possible packet congestion caused by one the logical channels. In response, the modem instructs the host to stop sending packets that are associated with that logical channel. The modem can continue to receive packets through the remaining logical channels.

It is to be understood that the process flow diagram of FIG. 3 is not intended to indicate that the blocks of the method 300 are to be executed in any particular order, or that all of the blocks are to be included in every case. Further, any number of additional blocks may be included within the method 300, depending on the specific implementation.

Figure 4:
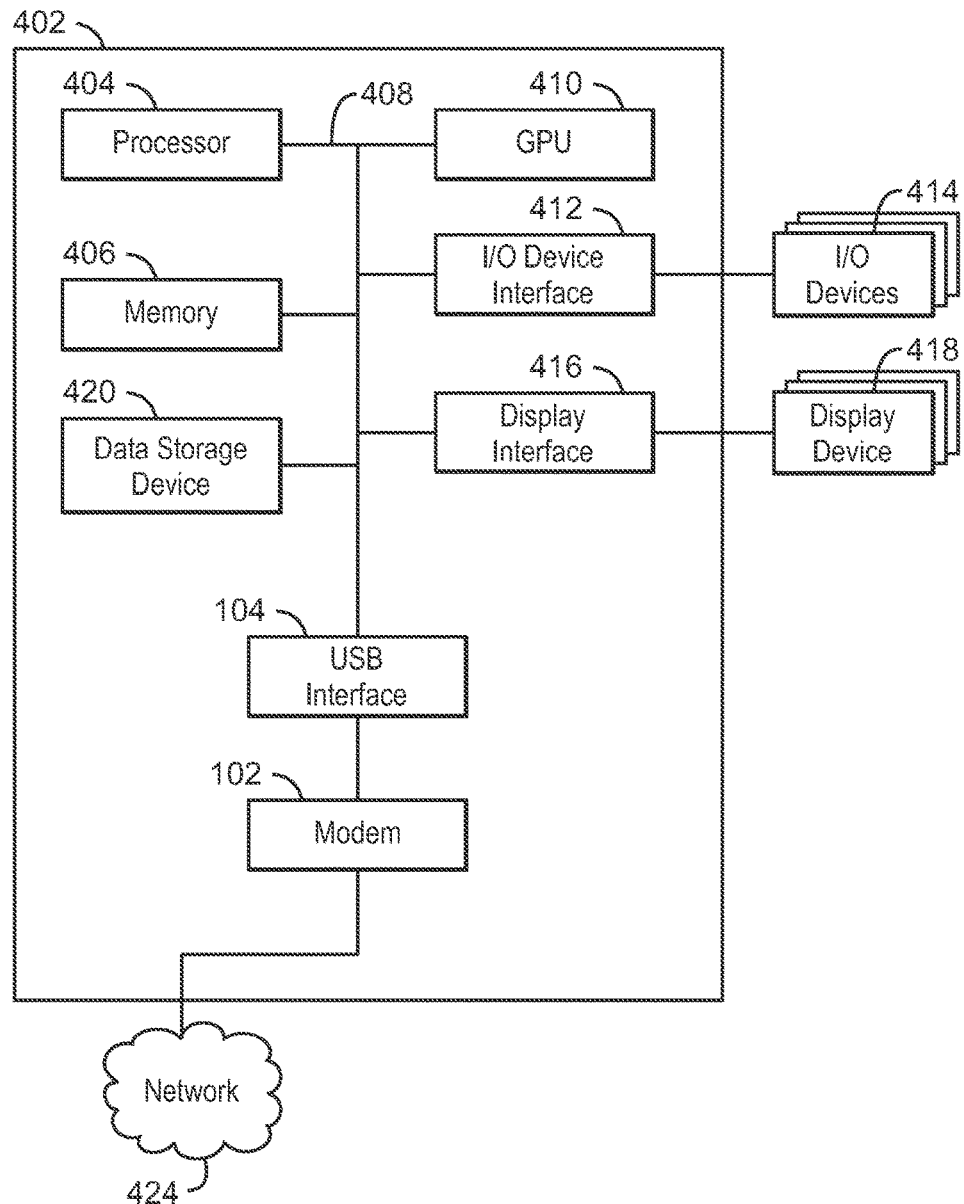
FIG. 4 is a block diagram of a computing device for implementing Quality of Service over a USB interface.

FIG. 4 is a block diagram of a computing device for implementing Quality of Service over a USB interface. The computing device 402 may be a laptop computer, desktop computer, Ultrabook, tablet computer, smart phone, an Internet of Things (IoT) appliance, among others. The computing device 402 may include a central processing unit (CPU) 404 that can be configured to execute stored instructions, as well as a memory device 406 that stores instructions that are executable by the CPU 404. The CPU may be coupled to the memory device 406 by a bus 408. Additionally, the CPU 404 can be a single core processor, a multi-core processor, a computing cluster, or any number of other configurations. Furthermore, the computing device 402 may include more than one CPU 404. In some examples, the computing device 402 is implemented as a System on a Chip (SoC), in which case some or all of the components may be implemented on a single integrated circuit ship.

The computing device 402 may also include a graphics processing unit (GPU) 410. As shown, the CPU 404 may be coupled through the bus 408 to the GPU 410. The GPU 410 may be configured to perform any number of graphics functions and actions. For example, the GPU 410 may be configured to render or manipulate graphics images, graphics frames, videos, or the like, to be displayed to a user of the computing device 402. The memory device 406 can include random access memory (RAM), read only memory (ROM), flash memory, or any other suitable memory systems. For example, the memory device 406 may include dynamic random access memory (DRAM).

The CPU 404 may be connected through the bus 408 to an input/output (I/O) device interface 412 configured to connect with one or more I/O devices 414. The I/O devices 414 may include, for example, a keyboard and a pointing device, wherein the pointing device may include a touchpad or a touchscreen, among others. The I/O devices 414 may be built-in components of the computing device 402, or may be devices that are externally connected to the computing device 402. In embodiments, the I/O devices 414 may be a keyboard or a pointing device that can be coupled with the I/O device interface 412 via a multiple protocol connection, such as a USB Type-C connection, similar to the USB package, MUX, and USB devices described below.

The CPU 404 may also be linked through the bus 408 to a display interface 416 configured to connect with one or more display devices 418. The display devices 418 may include a display screen that can be a built-in component of computing device 402. The display device 418 may also include a computer monitor, television, or projector, among others, that can be externally connected to the computing device 402. In embodiments, the display devices 418 may be a DisplayPort device that can be coupled with the display interface 416 interface via a multiple protocol connection, such as a USB Type-C connection, similar to the USB package, MUX, and USB devices described below.

The computing device 402 may also include a data storage device 420. The data storage device 420 can be a physical memory such as a hard drive, an optical drive, a thumb drive, an array of drives, or any combinations thereof. The storage device 420 may also include remote storage drives.

The computing device 402 may also include a modem 422 that enables applications running on the host processor 404 to connect to a network 430. The network 430 may be a wide area network (WAN), local area network (LAN), the Internet, a cellular network, among others. The modem 422 may be configured to implement any suitable wireless communication protocol, including 3G, 4G, LTE, and others. The modem 422 shown in FIG. 4 may the modem 102 described in relation to FIGS. 1 and 2.

The USB interface 104 communicatively couples the modem 102 to the processor 404. The processor 404 of FIG. 4 may be the same as the host 100 shown in FIGS. 1 and 2. The modem 102 enables applications running on the host processor 404 to communicate with a wireless network via one or more bearer channels. The applications running on the processor 404 may be configured to upload or download data to a remote server over the wireless network 424. For example, the applications may include games, applications for streaming video or music over the wireless network, video conferencing applications, and others. At least one of the one or more bearer channels can be managed by a set of packet filter rules corresponding to a Quality of Service (QoS) description.

The USB interface 104 includes a plurality of logical channels, and each logical channel includes logical channel endpoints. The USB interface 104 can implement Quality of Service by dedicating particular logical channel endpoints to particular bearer channels. The modem 102 sends packet filtering rules to the host 404, and the host 404 uses the packet filtering rules to distribute packets to the correct logical channel endpoints. In some examples, to solve packet congestion, the modem 102 can stop packet inflow from the host 404 for a particular logical channel that is causing the packet congestion while continuing to receive packets through other logical channels.

It can be understood that the block diagram of FIG. 4 may not include all of the components, nor are all components included in each version of the computing device 402. Rather, the computing device 402 can include fewer or additional components not illustrated in FIG. 4. Furthermore, the components may be coupled to one another according to any suitable system architecture, including the system architecture shown in FIG. 4 or any other suitable system architecture that uses a USB interface to facilitate communications between a host and a modem.

Figure 5:
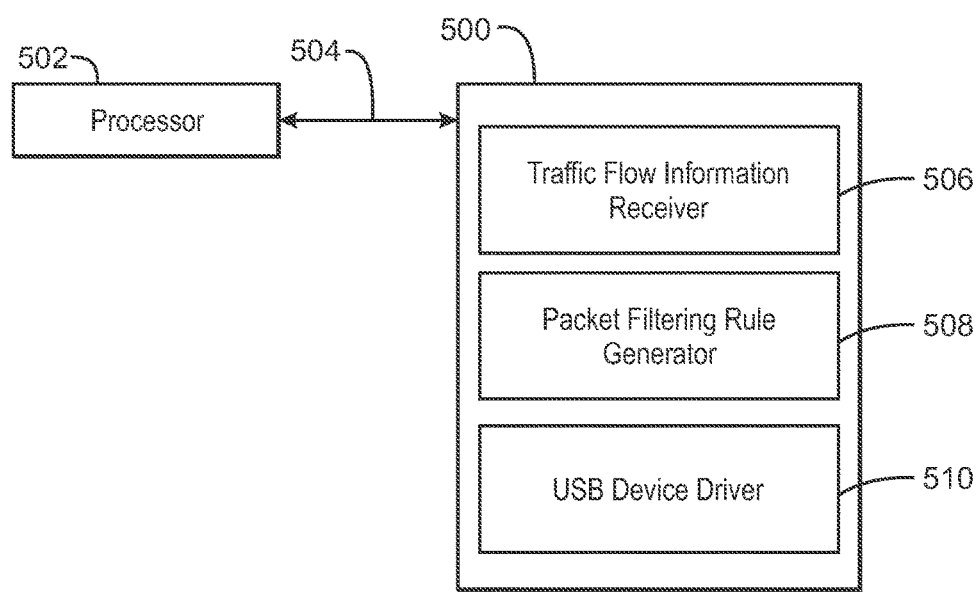
FIG. 5 is a block diagram showing a medium 500 that contains logic for implementing Quality of Service over a USB interface.

FIG. 5 is a block diagram showing a medium 500 that contains logic for implementing Quality of Service over a USB interface. The medium 500 may be a computer-readable medium, including a non-transitory medium, that stores code that can be accessed by a processor 502 over a computer bus 504. For example, the computer-readable medium 500 can be volatile or non-volatile data storage device. The medium 500 can also be a logic unit, such as an Application Specific Integrated Circuit (ASIC), a Field Programmable Gate Array (FPGA), or an arrangement of logic gates implemented in one or more integrated circuits, for example. In some examples, the medium is included in a modem.

The medium 500 may include modules 508-510 configured to perform the techniques described herein. The medium can include a traffic flow information receiver 506 configured to receive traffic flow information from a network. For example, the traffic flow information may be traffic flow template (TFT) information as defined by the 3GPP communication standard. The medium can also include a packet filter rule generator 508 that generates packet filtering rules based on the traffic flow information. The packet filter rule generator 508 can also send the packet filtering rules from the modem to a host. The medium can also include a USB device driver 510 configured to receive packets from the host through a plurality of logical channels comprising logical channel endpoints, wherein each logical channel endpoint dedicated to a particular bearer channel of the modem. In some embodiments, the modules 508-510 may be modules of computer code configured to direct the operations of the processor 502.

The block diagram of FIG. 5 is not intended to indicate that the medium 500 is to include all of the components shown in FIG. 5. Further, the medium 500 may include any number of additional components not shown in FIG. 5, depending on the details of the specific implementation.

Figure 6:
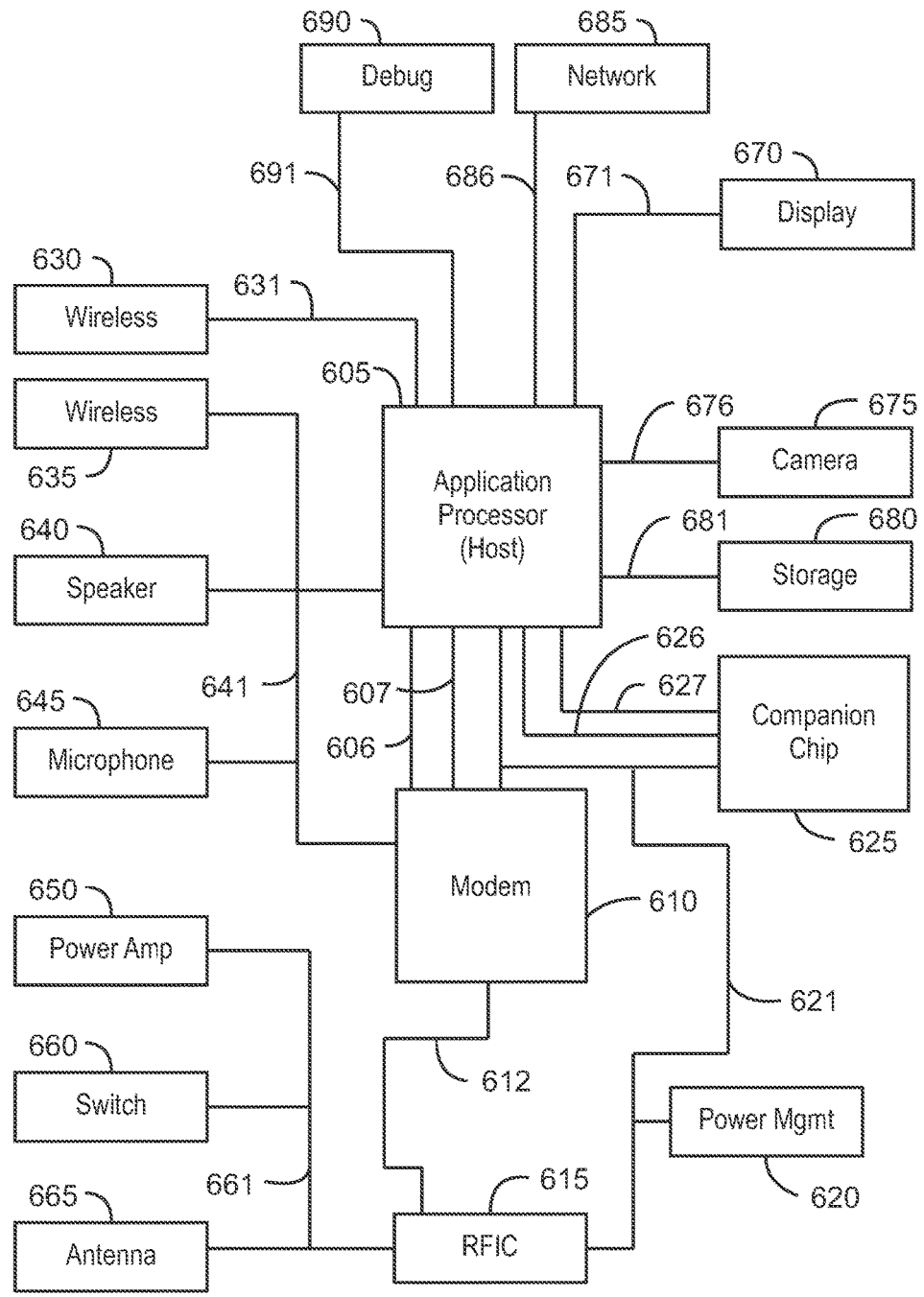
FIG. 6 is an embodiment of a low power computing platform that can implement the techniques described herein.

Referring to FIG. 6, an embodiment of a low power computing platform is depicted. In one embodiment, low power computing platform 600 includes a user equipment (UE). A UE refers to, in some embodiments, a device that may be used to communicate, such as a device with voice communication capability. Examples of a UE includes a phone, smartphone, tablet, ultraportable notebook, and a low power notebook. However, a low power computing platform may also refer to any other platform to obtain a lower power operating point, such as a tablet, low power notebook, an ultraportable or ultrathin notebook, a micro-server server, a low power desktop, a transmitting device, a receiving device, or any other known or available computing platform. The illustrated platform depicts a number of different interconnects to couple multiple different devices. Exemplary discussion of these interconnect are provided below to provide options on implementation and inclusion of apparatus' and methods disclosed herein. However, a low power platform 600 is not required to include or implement the depicted interconnects or devices. Furthermore, other devices and interconnect structures that are not specifically shown may be included.

Starting at the center of the diagram, platform 600 includes application processor 605. Often this includes a low power processor, which may be a version of a processor configuration described herein or known in the industry. As one example, processor 600 is implemented as a system on a chip (SoC). As a specific illustrative example, processor 600 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note as the processor and SoC technologies from these companies advance, more components illustrated as separate from host processor 600 may be integrated on an SoC. As a result, similar interconnects (and inventions therein) may be used "on-die."

In one embodiment, application processor 605 runs an operating system, user interface and applications. Here, application processor 605 often recognizes or is associated with an Instruction Set Architecture (ISA) that the operating system, user interface, and applications utilize to direct processor 605's operation/execution. It also typically interfaces to sensors, cameras, displays, microphones and mass storage. Some implementations offload time critical telecom-related processing to other components.

As depicted, host processor 605 is coupled to a wireless interface 630, such as WLAN, WiGig, WirelessHD, or other wireless interface. Here an LLI, SSIC, or UniPort compliant interconnect is utilized to couple host processor 605 and wireless interface 630.

LLI stands for low latency interface. LLI typically enables memory sharing between two devices. A bidirectional interface transports memory transactions between two devices and allows a device to access the local memory of another device; often this is done without software intervention, as if it was a single device. LLI, in one embodiment, allows three classes of traffic, carrying signals over the link, reducing GPIO count. As an example, LLI defines a layered protocol stack for communication or a physical layer (PHY), such as an MPHY that is described in more detail below.

SSIC refers to SuperSpeed Inter-Chip. SSIC may enable the design of high speed USB devices using a low power physical layer. As an example, a MPHY layer is utilized, while USB 3.0 compliant protocols and software are utilized over the MPHY for better power performance.

UniPro describes a layered protocol stack with physical layer abstraction, providing a general purpose, error-handling, high speed solution for interconnecting a broad range of devices and components: application processors, co-processors, modems, and peripherals, as well as supporting different types of data traffic including control messages, bulk data transfer and packetized streaming. UniPro may support usage of an MPHY or DPHY.

Other interfaces may also couple directly to host processor 605, such as debug 690, Network 685, Display 670, camera 675, and storage 680 through other interfaces that may utilize the apparatus and methods described herein.

Debug interface 690 and network 685 communicates with application processor 605 through a debug interface 691, e.g. PTI, or network connection, e.g. a debug interface that operates over a functional network connection 685.

Display 670 includes one or more displays. In one embodiment, display 670 includes a display with one or more touch sensors capable of receiving/sensing touch input. Here, display 670 is coupled to application processor 605 through display interface (DSI) 671. DSI 671 defines protocols between host processor and peripheral devices, which may utilize a D-PHY physical interface. It typically adopts pixel formats and a defined command set for video formats and signaling, such as Display Pixel Interface 2 (DPI-2), and control display module parameters, such as through a Display Command Set (DCS). As an example, DSI 671 operates at approximately 1.5 Gb/s per lane or to 6 Gb/s.

Camera 675, in one embodiment, includes an image sensor used for still pictures, video capture, or both. Front and back side cameras are common on mobile devices. Dual-cameras may be used to provide stereoscopic support. As depicted, camera 675 is coupled to application processor 605 through a peripheral interconnect, such as CSI 676. CSI 676 defines an interface between a peripheral device (e.g. camera, Image Signal Processor) and a host processor (e.g. 605, baseband, application engine). In one embodiment, image data transfers are performed over a DPHY, a unidirectional differential serial interface with data and clock signals. Control of the peripheral, in on embodiment, occurs over a separate back channel, such as camera control. As an illustrative example, the speed of CSI may range from 50 Mbps-2 Gbps, or any range/value therein.

Storage 680, in one example, includes a non-volatile memory used by the application processor 605 to store large amounts of information. It may be based on Flash technology or a magnetic type of storage, such as a hard-disk. Here, 680 is coupled to processor 605 through Universal Flash Storage (UFS) interconnect 681. UFS 681, in one embodiment, includes an interconnect that is tailored for low power computing platforms, such as mobile systems. As an example, it provides between 200 and 500 MB/s transfer rate (e.g. 300 MB/s) utilizing queuing features to increase random read/write speeds. In one implementations, UFS 681 uses the MPHY physical layer and a protocol layer, such as UniPro.

Modem 610 often stands for Modulator/demodulator. The modem 610 typically provides the interface to the cellular network. It's capable of communicating with different networks types and different frequencies, depending on which communication standard is used. In one embodiment, both voice and data connections are supported. Modem 610 is coupled to host 605 utilizing any known interconnect, such as one or more of LLI, SSIC, UniPro, Mobile Express, etc.

In one embodiment, a control bus is utilized to couple control or data interfaces, such as wireless 635, speaker 640, microphone 645. An example of such a bus is SLIMbus; a flexible low-power multi-drop interface capable of supporting a wide range of audio and control solutions. Other examples include PCM, I2S, I2C, SPI, and UART. Wireless 635 includes an interface, such as a short range communication standard between two devices (e.g. Bluetooth or NFC), a navigation system capable of triangulating position and/or time (e.g. GPS), a receiver for analog or radio broadcasts (e.g FM Radio), or other known wireless interface or standard. Speaker(s) 640 includes any device to generate sound, such as an electromechanical device to generate ringtones or music. Multiple speakers may be used for stereo or multi-channel sound. Microphone 645 is often utilized for voice input, such as talking during a call.

Radio Frequency Integrated Circuit (RFIC) 615 is to perform analog processing, such as processing of radio signals, e.g. amplification, mixing, filtering, and digital conversion. As depicted, RFIC 615 is coupled to modem 610 through interface 612. In one embodiment, interface 612 includes a bi-directional, high-speed interface (e.g. DigRF) that supports communication standards, such as LTE, 3GPP, EGPRS, UMTS, HSPA+, and TD-SCDMA. As a specific example, DigRF utilizes a frame-oriented protocol based on a M-PHY physical layer. DigRF is typically referred to as RF friendly, low latency, low power with optimized pin count that currently operations between 1.5 or 3 Gbps per lane and is configurable with multiple lanes, such as 4 lanes.

Interface 661 (e.g. a RF control interface) includes a flexible bus to support simple to complex devices. As a specific example, interface 661 includes a flexible two-wire serial bus, designed for control of RF Front-End components. One bus master may write and read to multiple devices, such as power amplifier 650 to amplify the RF signal, sensors to receive sensor input, switch module(s) 660 to switch between RF signal paths depending on a network mode, and antenna tuners 665 to compensate for bad antenna conditions or enhancing bandwidth. Interface 661, in one embodiment, has a group trigger function for timing-critical events and low EMI.

Power management 620 is used to provide all the different components in the mobile device 600 with power managed voltage, such as decreasing voltage or increasing it to improve efficiency for components in the mobile device. In one embodiment, it also controls and monitors the charge of the battery and remaining energy. A battery interface may be utilized between power management 620 and the battery. As an illustrative example, the battery interface includes a single-wire communication between a mobile terminal and smart/low cost batteries.

Figure 7:
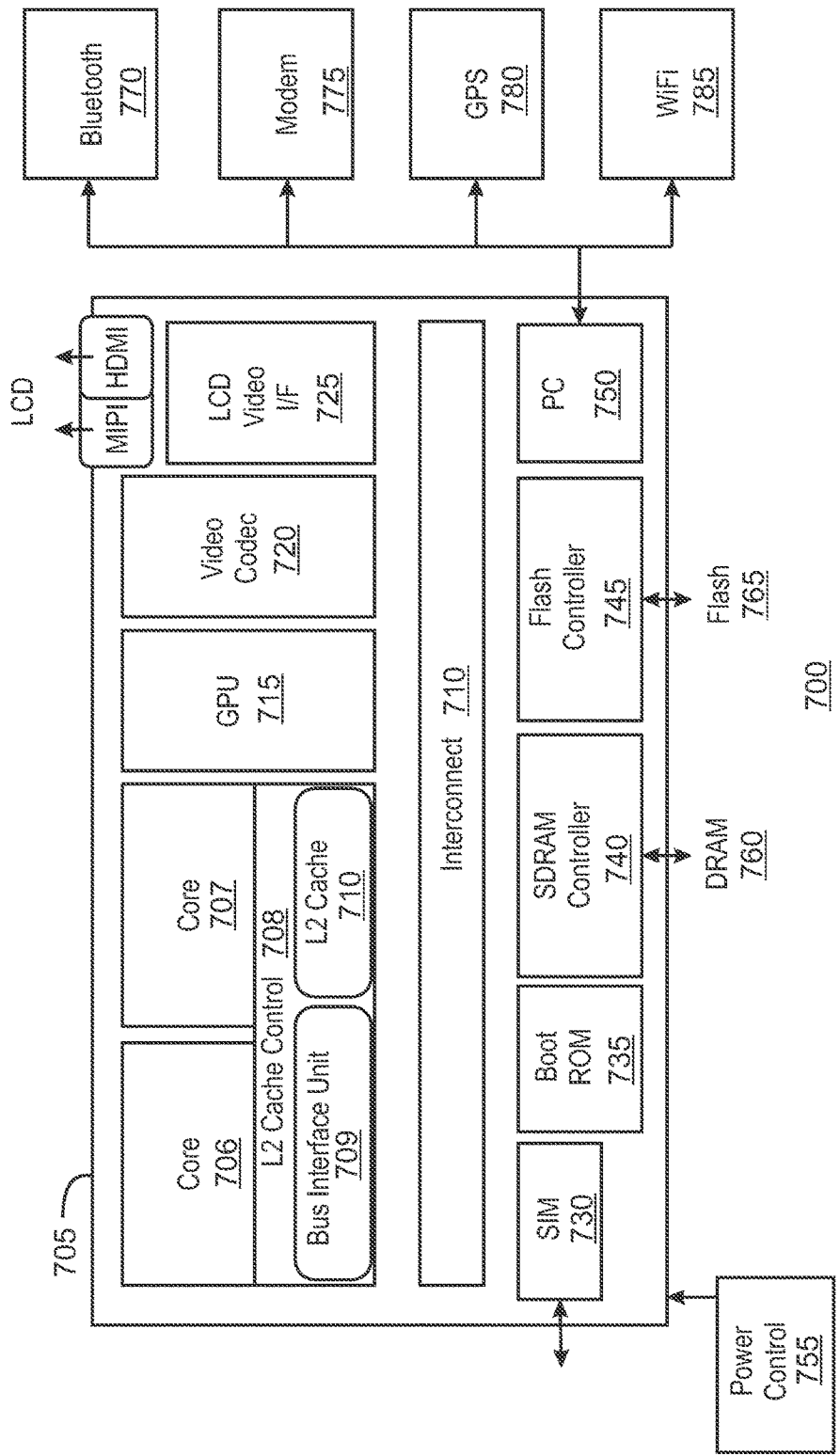
FIG. 7 is an embodiment of a System On-Chip (SOC) design that can implement the techniques described herein.

Turning next to FIG. 7, an embodiment of a system on-chip (SOC) design in accordance with the techniques is depicted. As a specific illustrative example, SOC 700 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 700 includes two cores—706 and 707. Similar to the discussion above, cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700. Interconnect 710 includes an on-chip interconnect, such as an IOSF, AMBA, or other interconnect discussed above, which potentially implements one or more aspects of the described invention.

Interface 710 provides communication channels to the other components, such as a Subscriber Identity Module (SIM) 730 to interface with a SIM card, a boot ROM 735 to hold boot code for execution by cores 706 and 707 to initialize and boot SOC 700, a SDRAM controller 740 to interface with external memory (e.g. DRAM 760), a flash controller 745 to interface with non-volatile memory (e.g. Flash 765), a peripheral control Q1650 (e.g. Serial Peripheral Interface) to interface with peripherals, video codecs 720 and Video interface 725 to display and receive input (e.g. touch enabled input), GPU 715 to perform graphics related computations, etc. Any of these interfaces may incorporate aspects of the invention described herein.

In addition, the system illustrates peripherals for communication, such as a Bluetooth module 770, modem 775, GPS 785, and WiFi 785. Note as stated above, a UE includes a radio for communication. As a result, these peripheral communication modules are not all required. However, in a UE some form a radio for external communication is to be included.

EXAMPLES

Example 1 is a computing device to implement Quality of Service (QoS) in a Universal Serial Bus (USB) interface. The computing device includes a modem to enable each of a plurality of IP applications to communicate with a network via one or more bearer channels, wherein at least one of the one or more bearer channels is managed by a set of packet filter rules corresponding to a Quality of Service (QoS) description, and wherein the plurality of IP applications are executed by a host; and a Universal Serial Bus (USB) interface to couple the host and the modem, the USB interface including a plurality of logical channels each including logical channel endpoints, wherein each logical channel endpoint is dedicated to a particular bearer channel.

Example 2 includes the computing device of example 1, including or excluding optional features. In this example, the modem sends packet filtering rules to the host, the host to use the packet filtering rules to distribute packets to a correct logical channel endpoint.

Example 3 includes the computing device of any one of examples 1 to 2, including or excluding optional features. In this example, upon detection of packet congestion, the modem can stop packet inflow from the host for a particular logical channel that is causing the packet congestion while continuing to receive packets through other logical channels of the plurality of logical channels.

Example 4 includes the computing device of any one of examples 1 to 3, including or excluding optional features. In this example, the plurality of logical channels comprise a first logical channel, which is a best effort logical channel, and a second logical channel that implements a QoS.

Example 5 includes the computing device of any one of examples 1 to 4, including or excluding optional features. In this example, the plurality of logical channels comprise a single download logical channel and plurality of upload logical channels.

Example 6 includes the computing device of any one of examples 1 to 5, including or excluding optional features. In this example, the plurality of logical channels comprise a first upload logical channel, which is a best effort logical channel, and a second upload logical channel that implements a QoS.

Example 7 includes the computing device of any one of examples 1 to 6, including or excluding optional features. In this example, the modem is a Long-Term Evolution (LTE) protocol modem.

Example 8 includes the computing device of any one of examples 1 to 7, including or excluding optional features. In this example, the computing device is a smart phone.

Example 9 includes the computing device of any one of examples 1 to 8, including or excluding optional features. In this example, the plurality of logical channels comprise a single best effort logical channel including multiple endpoints, and a single QoS logical channel including multiple endpoints.

Example 10 includes the computing device of any one of examples 1 to 9, including or excluding optional features. In this example, the plurality of logical channels comprise a single upload best effort logical channel, a single upload QoS logical channel, and a single download logical channel.

Example 11 is a method to implement Quality of Service (QoS) in a Universal Serial Bus (USB) interface. The method includes receiving, at a modem of a computing device, traffic flow information from a network; generating, at the modem, packet filtering rules based on the traffic flow information and sending the packet filtering rules from the modem to a host; and receiving, at the modem, packets from the host through a plurality of logical channels including logical channel endpoints, each logical channel endpoint dedicated to a particular bearer channel of the modem.

Example 12 includes the method of example 11, including or excluding optional features. In this example, the plurality of logical channels comprise multiple bulk IN endpoints and multiple bulk OUT endpoints.

Example 13 includes the method of any one of examples 11 to 12, including or excluding optional features. In this example, the packet filtering rules cause the host to determine to which logical channel endpoint to send a packet.

Example 14 includes the method of any one of examples 11 to 13, including or excluding optional features. In this example, the method includes upon detecting possible congestion, instructing the host to stop sending packets that are associated with a particular one of the logical channels.

Example 15 includes the method of any one of examples 11 to 14, including or excluding optional features. In this example, the method includes configuring one of the logical channels as a download logical channel that receives all of the packets to be sent from the modem to the host.

Example 16 includes the method of any one of examples 11 to 15, including or excluding optional features. In this example, the method includes configuring one of the logical channels as an upload logical channel that is a best effort logical channel, and configuring at least two additional logical channels as upload logical channels configured to implement a Quality of Service (QoS).

Example 17 includes the method of any one of examples 11 to 16, including or excluding optional features. In this example, the modem is an Long-Term Evolution (LTE) modem.

Example 18 includes the method of any one of examples 11 to 17, including or excluding optional features. In this example, the traffic flow information is Traffic Flow Template (TFT) information as defined by the 3GPP communication standard.

Example 19 includes the method of any one of examples 11 to 18, including or excluding optional features. In this example, the method includes configuring one of the logical channels as a best effort logical channel including multiple endpoints, and configuring one of the logical channels as a QoS logical channel including multiple endpoints.

Example 20 includes the method of any one of examples 11 to 19, including or excluding optional features. In this example, the method includes configuring one of the logical channels as a upload best effort logical channel, configuring one of the logical channels as an upload QoS logical channel, and configuring one of the logical channels as a download logical channel.

Example 21 is a tangible, non-transitory, computer-readable medium. The computer-readable medium includes instructions that direct the processor to receive, at a modem of a computing device, traffic flow information from a network; generate, at the modem, a packet filtering rule based on the traffic flow information and send the packet filtering rule from the modem to a host; and receive, at the modem, packets from the host through a plurality of logical channels including logical channel endpoints, each logical channel endpoint dedicated to a particular bearer channel of the modem.

Example 22 includes the computer-readable medium of example 21, including or excluding optional features. In this example, the plurality of logical channels comprise multiple bulk IN endpoints and multiple bulk OUT endpoints.

Example 23 includes the computer-readable medium of any one of examples 21 to 22, including or excluding optional features. In this example, the host determines to which logical channel endpoint to send a packet based on the packet filtering rules.

Example 24 includes the computer-readable medium of any one of examples 21 to 23, including or excluding optional features. In this example, the computer-readable medium includes instructions to direct the processor to, upon detecting possible congestion on a particular one of the logical channels, instruct the host to stop sending packets that are associated with the particular one of the logical channels.

Example 25 includes the computer-readable medium of any one of examples 21 to 24, including or excluding optional features. In this example, the computer-readable medium includes instructions to direct the processor to configure one of the logical channels as a download logical channel that is to receive all of the packets to be sent from the modem to the host.

Example 26 includes the computer-readable medium of any one of examples 21 to 25, including or excluding optional features. In this example, the computer-readable medium includes instructions to direct the processor to configure one of the logical channels as an upload logical channel that is a best effort logical channel, and configure at least two additional logical channels a upload logical channels configured to implement a Quality of Service (QoS).

Example 27 includes the computer-readable medium of any one of examples 21 to 26, including or excluding optional features. In this example, the modem is a Long-Term Evolution (LTE) protocol modem.

Example 28 includes the computer-readable medium of any one of examples 21 to 27, including or excluding optional features. In this example, the traffic flow information is Traffic Flow Template (TFT) information as defined by the 3GPP communication standard.

Example 29 includes the computer-readable medium of any one of examples 21 to 28, including or excluding optional features. In this example, the computer-readable medium includes instructions to direct the processor to configure one of the logical channels as a best effort logical channel including multiple endpoints, and configure one of the logical channels as a QoS logical channel including multiple endpoints.

Example 30 includes the computer-readable medium of any one of examples 21 to 29, including or excluding optional features. In this example, the computer-readable medium includes instructions to direct the processor to configure one of the logical channels as a upload best effort logical channel, configure one of the logical channels as an upload QoS logical channel, and configure one of the logical channels as a download logical channel.

Example 31 is an apparatus to implement Quality of Service (QoS) in a Universal Serial Bus (USB) interface. The apparatus includes instructions that direct the processor to means for receiving, at a modem of a computing device, traffic flow information from a network; means for generating, at the modem, packet filtering rules based on the traffic flow information and sending the packet filtering rules from the modem to a host; and means for receiving, at the modem, packets from the host through a plurality of logical channels including logical channel endpoints, each logical channel endpoint dedicated to a particular bearer channel of the modem.

Example 32 includes the apparatus of example 31, including or excluding optional features. In this example, the plurality of logical channels comprise multiple bulk IN endpoints and multiple bulk OUT endpoints.

Example 33 includes the apparatus of any one of examples 31 to 32, including or excluding optional features. In this example, the packet filtering rules cause the host to determine to which logical channel endpoint to send a packet.

Example 34 includes the apparatus of any one of examples 31 to 33, including or excluding optional features. In this example, the apparatus includes means for instructing the host, upon detection of possible congestion, to stop sending packets that are associated with a particular one of the logical channels.

Example 35 includes the apparatus of any one of examples 31 to 34, including or excluding optional features. In this example, the apparatus includes means for configuring one of the logical channels as a download logical channel that receives all of the packets to be sent from the modem to the host.

Example 36 includes the apparatus of any one of examples 31 to 35, including or excluding optional features. In this example, the apparatus includes means for configuring one of the logical channels as an upload logical channel that is a best effort logical channel, and configuring at least two additional logical channels as upload logical channels configured to implement a Quality of Service (QoS).

Example 37 includes the apparatus of any one of examples 31 to 36, including or excluding optional features. In this example, the modem is a Long-Term Evolution (LTE) modem.

Example 38 includes the apparatus of any one of examples 31 to 37, including or excluding optional features. In this example, the traffic flow information is Traffic Flow Template (TFT) information as defined by the 3GPP communication standard.

Example 39 includes the apparatus of any one of examples 31 to 38, including or excluding optional features. In this example, the apparatus includes means for configuring one of the logical channels as a best effort logical channel including multiple endpoints, and configuring one of the logical channels as a QoS logical channel including multiple endpoints.

Example 40 includes the apparatus of any one of examples 31 to 39, including or excluding optional features. In this example, the apparatus includes means for configuring one of the logical channels as a upload best effort logical channel, configuring one of the logical channels as an upload QoS logical channel, and configuring one of the logical channels as a download logical channel.

Example 41 is a modem to communicate with a host through a USB interface that implements Quality of Service (QoS), the modem. The modem to communicate with a host through a USB interface that implements Quality of Service (QoS), the modem includes instructions that direct the processor to a traffic flow information receiver to receive traffic flow information from a network; a packet filtering rule generator to generate a packet filtering rule based on the traffic flow information and send the packet filtering rule from the modem to a host, wherein the host implements Quality of Service (QoS) over a Universal Serial Bus (USB) interface using the packet filtering rules; and a USB device driver to receive packets from the host through a plurality of logical channels including logical channel endpoints, each logical channel endpoint dedicated to a particular bearer channel of the modem.

Example 42 includes the modem to communicate with a host through a USB interface that implements Quality of Service (QoS), the modem of example 41, including or excluding optional features. In this example, the plurality of logical channels comprise multiple bulk IN endpoints and multiple bulk OUT endpoints.

Example 43 includes the modem to communicate with a host through a USB interface that implements Quality of Service (QoS), the modem of any one of examples 41 to 42, including or excluding optional features. In this example, the host determines to which logical channel endpoint to send a packet based on the packet filtering rules.

Example 44 includes the modem to communicate with a host through a USB interface that implements Quality of Service (QoS), the modem of any one of examples 41 to 43, including or excluding optional features. In this example, the modem is to instruct the host to stop sending packets that are associated with a particular one of the logical channels upon detecting possible congestion on the particular one of the logical channels.

Example 45 includes the modem to communicate with a host through a USB interface that implements Quality of Service (QoS), the modem of any one of examples 41 to 44, including or excluding optional features. In this example, the modem is to configure one of the logical channels as a download logical channel that is to receive all of the packets to be sent from the modem to the host.

Example 46 includes the modem to communicate with a host through a USB interface that implements Quality of Service (QoS), the modem of any one of examples 41 to 45, including or excluding optional features. In this example, the modem is to configure one of the logical channels as an upload logical channel that is a best effort logical channel, and configure at least two additional logical channels a upload logical channels configured to implement a Quality of Service (QoS).

Example 47 includes the modem to communicate with a host through a USB interface that implements Quality of Service (QoS), the modem of any one of examples 41 to 46, including or excluding optional features. In this example, the modem is a Long-Term Evolution (LTE) protocol modem.

Example 48 includes the modem to communicate with a host through a USB interface that implements Quality of Service (QoS), the modem of any one of examples 41 to 47, including or excluding optional features. In this example, the traffic flow information is Traffic Flow Template (TFT) information as defined by the 3GPP communication standard.

Example 49 includes the modem to communicate with a host through a USB interface that implements Quality of Service (QoS), the modem of any one of examples 41 to 48, including or excluding optional features. In this example, the modem is to configure one of the logical channels as a best effort logical channel including multiple endpoints, and configure one of the logical channels as a QoS logical channel including multiple endpoints.

Example 50 includes the modem to communicate with a host through a USB interface that implements Quality of Service (QoS), the modem of any one of examples 41 to 49, including or excluding optional features. In this example, the modem is to configure one of the logical channels as a upload best effort logical channel, configure one of the logical channels as an upload QoS logical channel, and configure one of the logical channels as a download logical channel.

In the above description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a computer-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, described herein. The various appearances "an embodiment," "one embodiment," or "some embodiments" are not necessarily all referring to the same embodiments.

Not all components, features, structures, or characteristics described and illustrated herein are to be included in a particular embodiment or embodiments in every case. If the specification states a component, feature, structure, or characteristic "may", "might", "can" or "could" be included, for example, that particular component, feature, structure, or characteristic may not be included in every case. If the specification or claims refer to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein may not be arranged in the particular way illustrated and described herein. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A computing device, comprising:
    a modem to enable each of a plurality of IP applications to communicate with a network via a plurality of bearer channels established between the modem and the network, wherein:
        each bearer channel is managed by a set of packet filter rules corresponding to a Quality of Service (QoS) description; and
        the plurality of IP applications are executed by a host; and
    a Universal Serial Bus (USB) interface to couple the host and the modem, the USB interface comprising a plurality of logical channels established for communication between the host and the modem, wherein:
        each logical channel is dedicated to a subset of bearer channels of the plurality of bearer channels;
        each logical channel comprises a plurality of logical channel endpoints, wherein each logical channel endpoint is dedicated to one or more bearer channels of the subset of bearer channels; and
        each logical channel is managed based on a particular quality of service (QoS) grouping, wherein the particular QoS grouping comprises a plurality of QoS descriptions corresponding to the subset of bearer channels.

2. The computing device of claim 1, wherein the modem sends the set of packet filter rules to the host, the host to use the set of packet filter rules to distribute packets to a correct logical channel endpoint.

3. The computing device of claim 1, wherein, upon detection of packet congestion, the modem can stop packet inflow from the host for a particular logical channel that is causing the packet congestion while continuing to receive packets through other logical channels of the plurality of logical channels.

4. The computing device of claim 1, wherein the plurality of logical channels comprises a first logical channel and a second logical channel, wherein the first logical channel corresponds to a first QoS grouping associated with a best effort quality of service, and wherein the second logical channel corresponds to a second QoS grouping associated with a higher quality of service than the first QoS grouping.

5. The computing device of claim 1, wherein the plurality of logical channels comprises a single download logical channel and plurality of upload logical channels.

6. The computing device of claim 5, wherein the plurality of logical channels comprises a first upload logical channel and a second upload logical channel, wherein the first upload logical channel corresponds to a first QoS grouping associated with a best effort quality of service, and wherein the second upload logical channel corresponds to a second QoS grouping associated with a higher quality of service than the first QoS grouping.

7. The computing device of claim 1, wherein the plurality of logical channels comprises a single best effort logical channel comprising multiple endpoints, and a single high QoS logical channel comprising multiple endpoints.

8. The computing device of claim 1, wherein the plurality of logical channels comprises a single upload best effort logical channel, a single upload high QoS logical channel, and a single download logical channel.

9. A method, comprising:
receiving, at a modem of a computing device, traffic flow information associated with a plurality of bearer channels of a network, wherein the plurality of bearer channels is established for communication between the modem and the network;
generating, at the modem, packet filtering rules based on the traffic flow information, wherein the packet filtering rules comprise an indication of a Quality of Service (QoS) description for each bearer channel of the plurality of bearer channels;
sending the packet filtering rules from the modem to a host; and
receiving, at the modem, packets sent from the host via a Universal Serial Bus (USB) interface, wherein the USB interface comprises a plurality of logical channels established for communication between the host and the modem, wherein:
each logical channel is dedicated to a subset of bearer channels of the plurality of bearer channels;
each logical channel comprises a plurality of logical channel endpoints, wherein each logical channel endpoint is dedicated to one or more bearer channels of the subset of bearer channels; and
each logical channel is managed based on a particular quality of service (QoS) grouping, wherein the particular QoS grouping comprises a plurality of QoS descriptions corresponding to the subset of bearer channels.

10. The method of claim 9, wherein the plurality of logical channels comprises multiple bulk IN endpoints and multiple bulk OUT endpoints.

11. The method of claim 9, wherein the packet filtering rules cause the host to determine to which logical channel endpoint to send a packet.

12. The method of claim 9, further comprising upon detecting possible congestion, instructing the host to stop sending packets that are associated with a particular one of the plurality of logical channels.

13. The method of claim 9, further comprising configuring one of the plurality of logical channels as a download logical channel that receives all of the packets to be sent from the modem to the host.

14. The method of claim 9, further comprising configuring one of the plurality of logical channels as an upload logical channel that is a best effort logical channel, and configuring at least two additional logical channels as upload logical channels configured to implement at least two additional QoS groupings.

15. The method of claim 9, wherein the traffic flow information is Traffic Flow Template (TFT) information as defined by the 3GPP communication standard.

16. A tangible, non-transitory, computer-readable medium comprising instructions that, when executed by a processor, direct the processor to:
receive, at a modem of a computing device, traffic flow information associated with a plurality of bearer channels of a network, wherein the plurality of bearer channels is established for communication between the modem and the network;
generate, at the modem, packet filtering rules based on the traffic flow information, wherein the packet filtering rules comprise an indication of a Quality of Service (QoS) description for each bearer channel of the plurality of bearer channels;
send the packet filtering rule from the modem to a host; and
receive, at the modem, packets sent from the host via a Universal Serial Bus (USB) interface, wherein the USB interface comprises a plurality of logical channels established for communication between the host and the modem, wherein:
each logical channel is dedicated to a subset of bearer channels of the plurality of bearer channels;
each logical channel comprises a plurality of logical channel endpoints, wherein each logical channel endpoint is dedicated to one or more bearer channels of the subset of bearer channels; and
each logical channel is managed based on a particular quality of service (QoS) grouping, wherein the particular QoS grouping comprises a plurality of QoS descriptions corresponding to the subset of bearer channels.

17. The computer-readable medium of claim 16, wherein the plurality of logical channels comprises multiple bulk IN endpoints and multiple bulk OUT endpoints.

18. The computer-readable medium of claim 16, wherein the host determines to which logical channel endpoint to send a packet based on the packet filtering rules.

19. The computer-readable medium of claim 16, further comprising instructions to direct the processor to, upon detecting possible congestion on a particular logical channel of the plurality of logical channels, instruct the host to stop sending packets that are associated with the particular logical channel.

20. The computer-readable medium of claim 16, further comprising instructions to direct the processor to configure one of the plurality of logical channels as a download logical channel that is to receive all of the packets to be sent from the modem to the host.

* * * * *